United States Patent [19]

Preuss

[11] 4,399,471
[45] Aug. 16, 1983

[54] APPARATUS FOR RECORDING IMAGE INFORMATION AND SOUND RECORDINGS, PRESENTED AS ELECTRICAL INPUT SIGNALS, ON AN IMAGE RECORD PLATE

[75] Inventor: Heinz Preuss, Hanover, Fed. Rep. of Germany

[73] Assignee: BTS Systementwicklungs GmbH, Berlin, Fed. Rep. of Germany

[21] Appl. No.: 211,898

[22] Filed: Dec. 1, 1980

[30] Foreign Application Priority Data

Dec. 11, 1979 [DE] Fed. Rep. of Germany ....... 2949813

[51] Int. Cl.³ .......................... H04N 1/22; G11B 7/00
[52] U.S. Cl. ................................... 358/298; 369/111; 369/93; 358/341; 358/342
[58] Field of Search ................. 369/111, 112, 119, 93, 369/95, 47, 43, 110, 125; 358/127, 128.5, 296, 298, 302, 206, 208, 342, 341, 347, 348, 335; 346/76 L, 108, 109; 350/6, 7, 6.8, 380, 401

[56] References Cited

U.S. PATENT DOCUMENTS

| 2,972,660 | 2/1961 | Toulon | 358/128.5 |
| 3,939,302 | 2/1976 | Kihara | 369/112 |
| 4,213,158 | 7/1980 | De Benedictis | 358/296 |
| 4,245,247 | 1/1981 | Fike | 358/296 |

FOREIGN PATENT DOCUMENTS

2427428 12/1975 Fed. Rep. of Germany ...... 358/298

*Primary Examiner*—Alan Faber

*Attorney, Agent, or Firm*—Becker & Becker, Inc.

[57] ABSTRACT

Apparatus to record image information, presented in the form of electrical input signals, as complete half-tone images in a spiral centered about the center of a plate-shaped image record and to make sound recordings, from electrical input signals, presented as an optical sound track aligned with and adjacent to the line of half-tone complete images, and to record optical control tracks for controlling playback of the record adjacent to and aligned with the spiral of the half-tone complete images. The apparatus includes digital to analogue convertors; a Read Only Memory; an image sound line Random Access Memory, wherein, in a desired order and line-by-line, electrical input impulses, representing image and sound information, after undergoing analog to digital conversion, are recorded together with ROM information to form the control tracks; a laser producing an output light beam; a modulator modulating the light beam with information coming, after digital to analog conversion, from the image sound line Random Access Memory; a sweep deflecting unit, whereby the modulated laser beam, on being deflected thereby is swept along a line on a light-sensitive layer at the time of recording; an objective focussing the laser beam; a record turntable; and a carriage rotatably supporting the record turntable that supports an image record having a light-sensitive layer, whereon the light beam, after being focussed in the objective, is pointed for the line-by-line recording of the information taken from the image sound line Random Access Memory.

11 Claims, 4 Drawing Figures

APPARATUS FOR RECORDING IMAGE INFORMATION AND SOUND RECORDINGS, PRESENTED AS ELECTRICAL INPUT SIGNALS, ON AN IMAGE RECORD PLATE

BACKGROUND OF THE INVENTION (i) Field of the Invention

The present invention relates to an apparatus for recording image information, presented in the form of electrical input signals, as complete half-tone images in a spiral centered on the center of an image record in the form of a plate and for making sound recordings, from electrical input signals, as an optical sound track lined up with and next to the line of half-tone complete images, and furthermore for recording optical control tracks for controlling playback of the record, such control tracks being next to and lined up with the spiral of the half-tone complete images.

The electric image and sound input signals coming to the apparatus may, for example, be the output signals of a film scanner, of a video camera, of a TV receiver, of a magnetic tape reader or of an apparatus on the same lines, with which stored information is changed into electrical signals.

Such an apparatus may be used for producing image records themselves or for producing a matrix for pressing such image records, which may then be played back by an image record playback apparatus.

(ii) The Prior Art

A playback apparatus exists in the prior art according to which an image record, having a row of half-tone frames placed in a spiral, may be produced by projection of images on a light-sensitive layer on the image record. However, in this case, the input is in the form of a film strip with a row of half tone complete frames, for example moving picture frames, which are run continuously through a projection apparatus, having a slot diaphragm, while the image record is turned (see the German Offenlegungsschrift specification No. 2,427,428). If, during operation of such apparatus, sound information and control information (lined up with the images or frames on the record) for controlling motion of the record on later playback, is to be recorded, it is necessary for such information to be present on the film (that is to be copied, onto the record) at positions answering to positions on the record or it is necessary for copying to take place later in a separate operation. Accordingly, shortcomings exists not only with respect to getting the further information lined up with the images or frames, but furthermore such a second, separate exposure of the light-sensitive layer on the record is a complex and costly operation.

SUMMARY OF THE INVENTION

An object of the present invention is; a process for producing an image record in one single working step and using an apparatus designed as a single unit, according to which, on a light-sensitive layer on the top side of the image record, a spirally arranged row of half-tone complete images is produced, and adjacent thereto, one or more sound tracks, placed in a desired relation to the images, and, furthermore, including a control track for automatic control of the playback speed of the record, a control track for producing regulation to take into account undesired motion of the record or vibrations in the plane of the light-sensitive layer, and a control track for regulation to take into account record motion in a direction normal to the plane of the light-sensitive layer. In this respect, the input signals are electric pulses and the image, sound and control signals are produced by different pulse producers.

The wording "light-sensitive layer" is used herein not only for covering one in which reactions are caused by light so that parts of the image field become darker in a way representative of half-tones, but furthermore a layer in which more or less deep hollows are produced by the evaporation of material caused by the incoming light.

For effecting these and other purposes the apparatus of the invention has (1) a ROM or read only memory, an image sound line RAM or random access memory, in which, in a desired order and line-by-line, electrical input impulses, representative of the image and sound information, after undergoing analog to digital conversion, may be recorded together with information, present in said ROM or read only memory, for forming the said control tracks, (2) a digital to analog converter, a laser for producing an output light beam, a modulator for modulating said light beam with information coming, after digital to analog conversion in said converter, from the image sound line RAM or random access memory, (3) a sweep deflecting unit, with which the modulated laser beam, on being deflected by the same, may be swept along a line on a light-sensitive layer at the time of recording, and an objective for focussing the said laser beam, and (4) a record turntable, a carriage rotatably supporting said record turntable, said turntable being designed for supporting an image record having a light-sensitive layer onto which the light beam, after being focussed in the objective, is pointed for the line-by-line recording of the information taken from the image sound line RAM or random access memory.

The modulator may be an electro-optic or an electro-acoustic modulator while the movable deflecting unit may be a vibratory mirror, a turning prism or a turning mirror wheel with flats.

Further forms and developments of the invention will be apparent from the following.

The structure may have, in part of the path of the light from the modulator to the mirror wheel, a polarization switch, a double-refracting crystal placed after said switch in the direction of the light, and after said crystal in the direction of the light, a ray splitter, making an angle of 45° to the light path, and designed for deflecting the light beam at a right angle to the mirror flats of said mirror wheel, and a system for switching over said polarization switch when a corner, formed between two mirror flats of the mirror wheel, gets to the beam reflected in said double-refracting crystal, and when the beam, not deflected in said crystal, is directed normally to one mirror flat of said mirror wheel. The structure may also have a first objective, a second objective on the light output side of said first objective, a second double-refracting crystal on the light output side of said second objective, said first and second objectives and said second double-refracting crystal being placed in the path of said light after being reflected by said mirror wheel, and a miroscope objective in the light path between the second double-refracting crystal and the light-sensitive layer.

The structure may further be provided with a linear motor for moving the carriage, a further linear motor for turning the turntable, and a control system for controlling such motion of the carriage and turning of the turntable. The structure may also have a condenser, and a cylindrical lens on the light output side of the condenser, the cylindrical lens having a cylinder axis normal to the line direction. The light-sensitive layer may be made up of a material designed to be evaporated under the effect of the light beam.

The useful effect of the apparatus of the present invention is that the recording may be produced on the image record at a high speed and that it is not only possible to produce the half-tone complete images by the light-sensitive layer becoming darker or black because of reactions, but it is furthermore possible for the image to be produced by evaporation of material. Such evaporation may be used for producing a negative matrix which, itself, may then later be used for pressing transparent gray-tone coatings on records or furthermore transparent record coatings, whose hollows are filled up with transparent material pigmented with gray-tone pigments.

IN THE DRAWINGS

A detailed account will now be given of working examples of the invention using the accompanying figures, these being diagrammatic.

DETAILED DESCRIPTION OF WORKING EXAMPLES OF THE INVENTION

Figure 1:
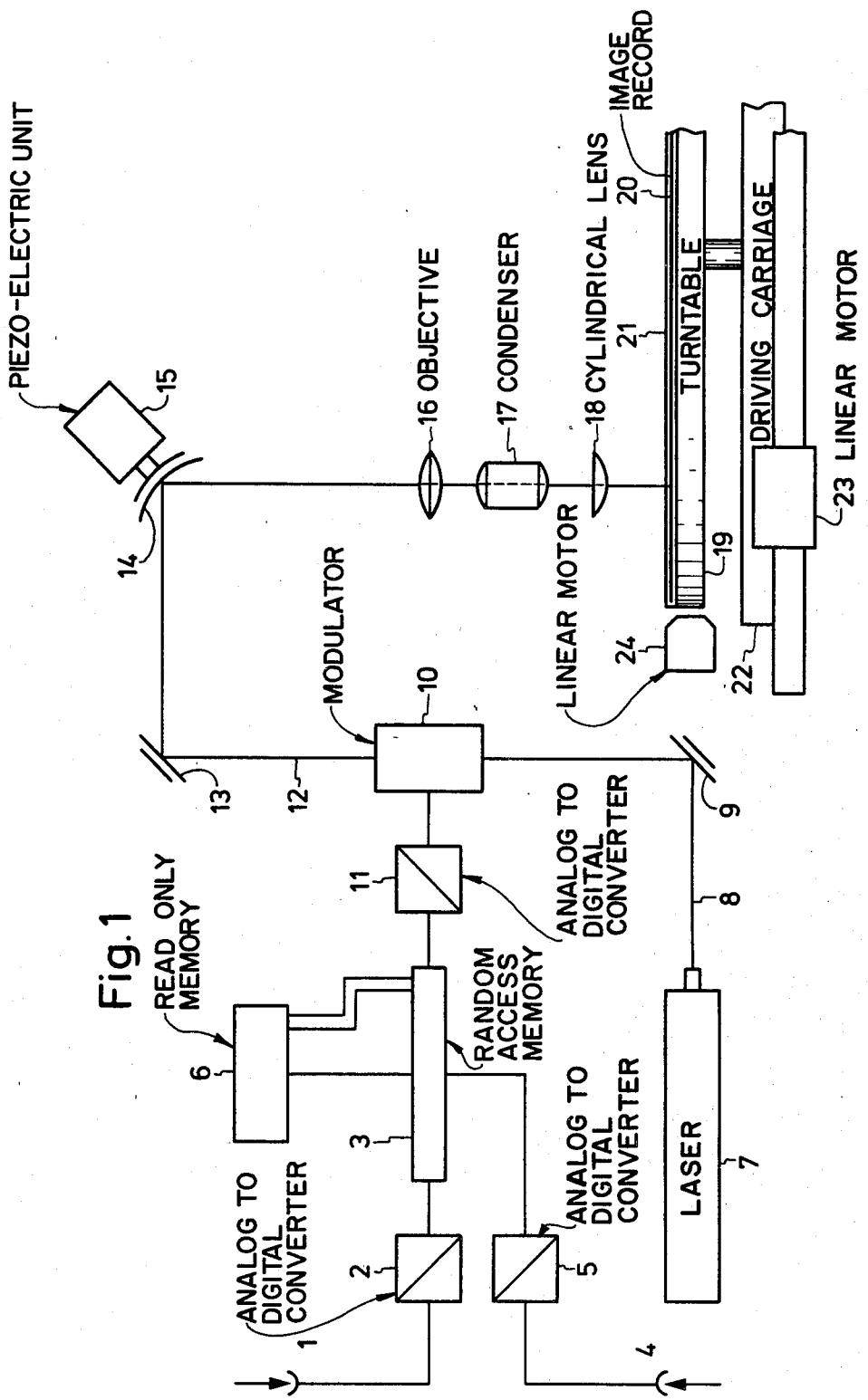
FIG. 1 is a view of a first form of an apparatus of the present invention.

Referring now to the drawings in detail with the apparatus of FIG. 1, image information comes in at input 1 and may be produced by line-by-line scanning of a half-tone complete image with a reader or it may come from an information-storing record or a magnetic tape. The input information has the form of a train of electrical pulses, coming one after the other or sequentially in time. Such pulses are changed in an analog-to-digital converter 2 into digital signals, which are supplied as input into an image sound line RAM or random access memory 3. Alternating with this, sound information, in the form of a train of electrical pulses coming one after the other or sequentially in time, is received at input 4 and, via a second analog-to-digital converter 5, is recorded in image sound line RAM or random access memory 3. A ROM or read only memory 6 is used for synchronous transmission of the information for forming the constant control tracks on the image sound line RAM or random access memory 3. For each image record, of which an account will be given later, these control tracks are the same, thus for example a continuous sine curve smoothly changing in frequency and used as the control track for controlling the playback speed. Further control tracks are straight lines, used as control tracks for causing automatic regulation for taking care of vibrations or shifting of the record. In the image sound line RAM 3, the separate information groups as noted are stored one after the other or sequentially in a linear row and, for this reason, in the form of a line of the image to be produced, this being in the order in which they are to be recorded on the record. For this reason, the image sound RAM 3 will have thereon, in each case, one line of the overall image to be produced on the image record, which is made up of sections of the half-tone complete image (which may be divided up into separate color separations or components), and sections for sound information and the separate control tracks.

A laser 7 is present producing an output beam 8, which is directed through a collimator (not figured), from which the light goes to a mirror 9 by which light is, in turn, directed to a conventional electro-optic or electro-acoustic modulator 10.

In the modulator, the light beam 8 from laser 7 is modulated with the signals supplied as output line-by-line from the image sound RAM 3, such signals first, however, being changed into analog signals in the digital-analog converter 11. The light beam 12 coming from modulator 10 is directed by a deflecting mirror 13 onto a sweeping unit 14, which may be a vibratory mirror, moved at a frequency equal to the line frequency and moved back on flyback. The vibratory mirror may be powered by a piezoelectric unit 15. Via the vibratory unit 14, the modulated light beam 12 is swept along the line of one frame or image on recording. After being deflected at vibratory mirror 14, light beam 12 first is focussed in an objective 16 and then made parallel in a condenser 17 so that the separate signals in question may be recorded in an almost completely point- or dot-form. On the output side of condenser 17 in the ray path it is possible to have a cylindrical lens 18 with a cylinder axis, normal to the line to be recorded, this being for making the line broader.

Under the light beam 12 coming from condenser 17 and in a plane normal thereto, there is a record turntable 19, on which a round image sound record 20 in the form of a plate is placed having a light-sensitive layer 21. The record on the turntable may be changed over and replaced by a new one as soon as the recording has been made. The line-up of the parts together with turntable 19 is such that each line recorded is radial with respect to the image record. Turntable 19 is supported on carriage 22, which may be moved by a linear motor 23 in the direction of the line to be recorded. Turntable 19 may be turned by a further linear motor 24 acting on its outer face.

Because of the combination of the two forms of motion, produced by the two linear motors 23 and 24, a spiral, centered on the middle point of image record 20, is produced when recording takes place, the recorded lines running radially. By the use of a programmable electronic control system, not shown, for controlling linear motor 23 for driving carriage 22, the pitch of the spiral lines may be changed or adjusted. Via a further electronic control system, not shown, for linear motor 24, the speed of turning of the record turntable is so changed on recording that the rate of angular deflection of beam 12, as measured at its point of incidence is the same all over the record, otherwise stated, equal-sized images are produced everywhere on the record where recording takes place.

Figure 2A:
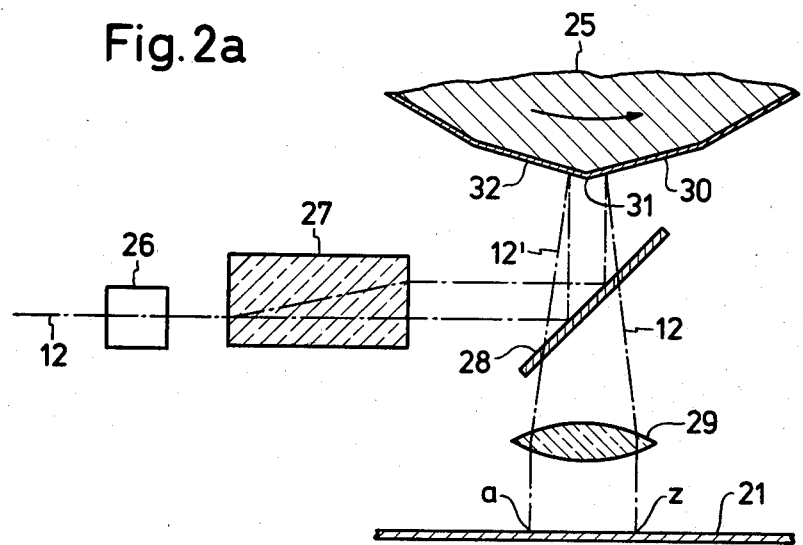
FIG. 2a is a view of a further part which may be used with the apparatus of FIG. 1 if a mirror wheel is used.
Figure 2B:
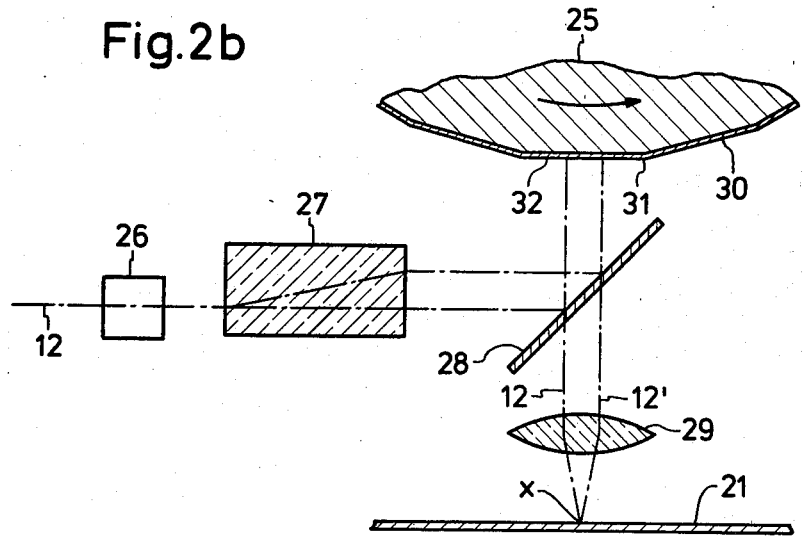
FIG. 2b is a further view of the apparatus of FIG. 2a, the mirror wheel having moved into a different position.

The vibratory mirror 14, to be seen in FIG. 1, is moved in a direction at an angle of 45° to the incoming light beam 12, which is deflected through 90°, the light beam being swept in position while keeping parallel to itself by the vibration of the mirror, for the purpose of recording one line on each vibration. While the vibratory mirror 14 is moving back again, cut off of light beam 12 is necessary, this being a shortcoming which may be overcome by using, instead of vibratory mirror 14, a turning prism or a mirror wheel with a great number of small mirror flats. However, as each corner between one mirror flat and the next one or each corner of the prism is moved through the beam, there is an undesired scatter or refraction, such scatter or refraction of light beam 12 taking place in two different directions. For this reason, there is necessary accordingly for beam 12 to be blanked so that it is not directed against the corners, such blanking taking place till the full beam cross-section is able to be directed onto the next mirror flat turning about an axis of the mirror wheel. To avoid such a loss in time, even though the loss be small, the present invention makes use of a mirror system which is shown in FIGS. 2a and 2b. In this case, mirror wheel 25 has mirror flats for causing sweep of the incoming light beam 12, which has gone through modulator 10 and has been deflected by mirror 13. The sweep caused by mirror wheel 25 makes the light beam 12 sweepingly go along the line to be recorded on light-sensitive layer 21. The apparatus furthermore has a polarization switch 26 and a calcite crystal 27 together with a beam splitter 28, placed in the light path between the crystal 27 and mirror wheel 25. Beam splitter 28 makes an angle of 45° relative to the axis of the light beam 12 coming towards it. On the lower light output side of beam splitter 28 and in the path of light reflected from wheel 25 and going through splitter 28, there is an objective 29 for focussing the light beam on the light-sensitive layer 21. With this system, by sweeping light beam 12 in calcite crystal 27, it is possible for each corner of mirror wheel 25 to be jumped over.

In FIG. 2a, the deflected beam 12' (the extraordinary ray) goes to mirror flat 30 of mirror wheel 25 and is reflected by the same through objective 29, the counter-clockwise turning of mirror wheel 25 causing the light to be sweepingly moved along the recording line on the record 21, the sweep being from point a to point z. When the light gets to point z, polarization switch 26 is actuated or put into operation so that beam 12 (the ordinary ray which is not deflected) will be directed onto mirror flat 32, jumping over mirror corner 31, mirror flat 32 directing the light to the start of a line (at point a). Between two such sweeping motions along lines radially with respect to record 19, the latter will have moved through a small distance so that the second line in question here will be started a small distance to the side of point a.

As shown by FIG. 2b, on further turning of mirror wheel 25, the ordinary, reflected beam 12 will be swept as far as point x (on the light-sensitive layer), which is at the middle of the line to be recorded, mirror flat 32 then being parallel to the plane of the light-sensitive layer 21 and to the reflected beam 12. At this point in time, polarization switch 26 is actuated again so that a deflected beam 12' (extraordinary ray) at this position of mirror flat 32, also will be directed exactly onto sweep point x so that further recording of the line takes place without any break. The extraordinary light beam 12' will then be swept along the line as far as the position shown in FIG. 2a. The switching over of polarization switch 26 takes place automatically and in timed relation to the end of each line coming from the image sound line RAM 3, and on getting to point x and such switching over may be controlled by ROM 6. Turning motion of mirror wheel 25 takes place synchronously and smoothly, in a way dependent on this. Recording takes place on these lines without any break on flyback.

Such a system is necessary for producing high frame frequencies and, for this reason, the mirror wheel is to be run at a high speed. In this case, high frequency beam cut off, in which case the beam would have to be cut off when backward motion of the sweep mirror takes place or for jumping over a corner of the mirror wheel or prism, would be undesired and not possible.

Figure 3:
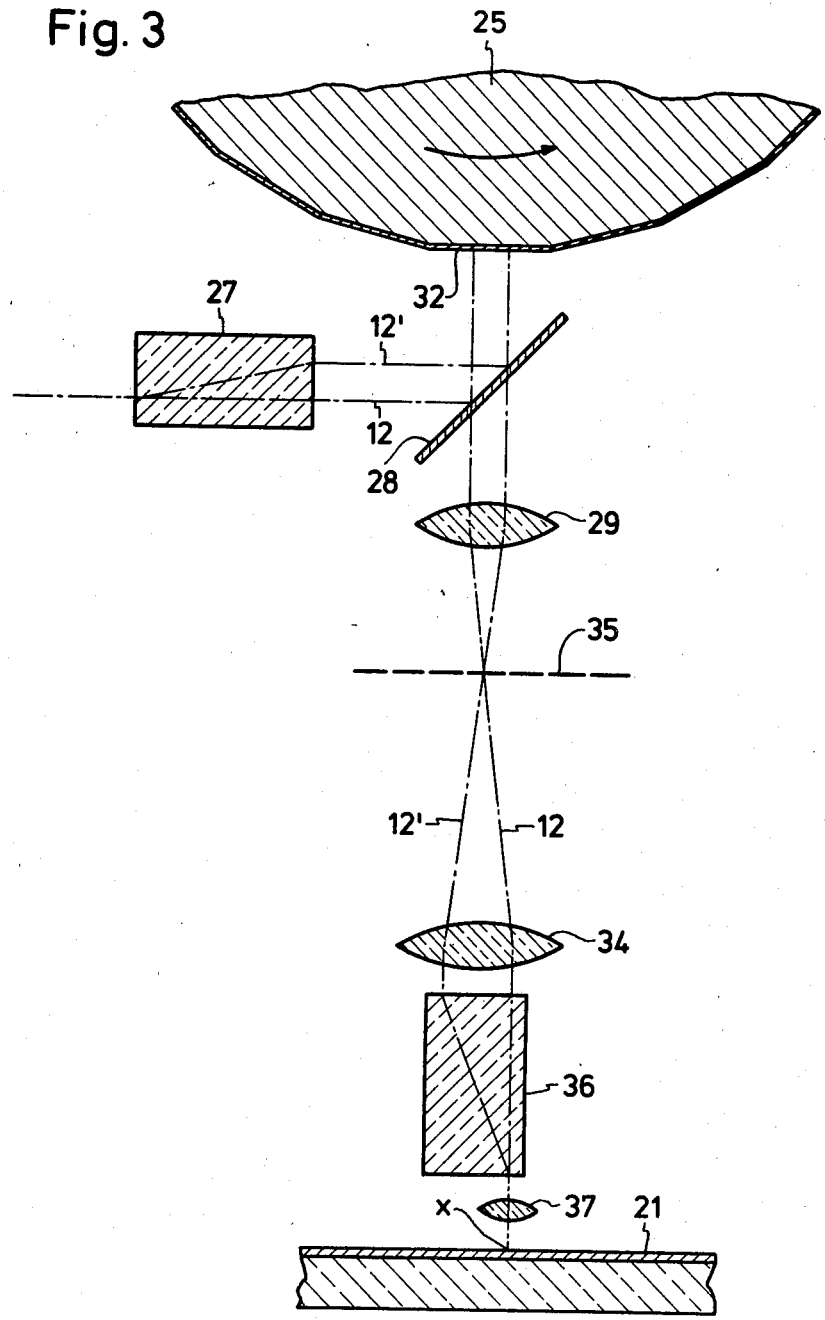
FIG. 3 is a view of a further part of the apparatus of FIGS. 2a and 2b having a microscope objective.

If very small images or frames are to be recorded, for example of a size of 1 to 2 square millimeters so that a microscope objective is necessary, a system is used according to FIG. 3.

Because of the separate parallel beam paths 12 and 12', according to the ordinary and, respectively extraordinary rays of calcite crystal 27, an overly great aperture of the objective projecting the light on the light-sensitive layer 21 would be necessary. For this reason, the two beams 12 and 12' necessarily must be united again on the input side of this objective.

For this reason, in the light path coming after objective 29, which for example has a focal length of 35 mm, there is a further objective 34 with a focal length of for example 90 mm, the inbetween image plane being numbered 35. In the ray path on the output side of objective 34, there is a second calcite crystal 36, by which beam 12' may be moved back again onto the ray path 12 so that only a single ray path 12 is present directed towards the microscope objective 37 and so that the signal coming from the modulator is projected in the form of a point on light-sensitive layer 21.

It would furthermore be possible, as part of the invention, to make use of stepper motors instead of linear motors 23 and 24, or for not only image, but furthermore the second information in the desired order to be inputted at input 1 or while the inputs 1 and 2 might be used only for image or only for sound information.

I claim:

1. In an apparatus to record image information, presented as electrical input signals, as complete half-tone images in a spiral centered on a plate-shaped image record and to make sound reordings, from electrical input signals, presented as an optical sound track aligned with and adjoining the line of half-tone complete images, and furthermore to record optical control tracks for controlling playback of the record, such control tracks being adjacent to and aligned with the spiral of the half tone complete images, said apparatus comprising in combination:
 (1) a read only memory, an image sound line random access memory operatively associated therewith, in which, in a desired order and line-by-line, electrical input impulses, representative of the image and sound information, after undergoing analog to digital conversion, are recorded together with information, present in said read only memory, to form the said control tracks,
 (2) a digital to analog converter, and operative associated therewith further including a laser for producing an output light beam, a modulator for modulating said light beam with information coming, after digital to analog conversion in said converter, from the image sound line random access memory, a sweep deflecting unit operatively associated with said laser and with which the modulated laser beam, on being deflected by said sweep deflecting unit is swept along a line on a light-sensitive layer at the time of recording, and an objective for focussing the said laser beam, and a record turntable, a carriage turningly supporting said record turntable, said turntable being arranged for supporting an image record having a light-sensitive layer, onto which the light beam, after being focussed in the objective, is pointed for the line-by-line recording of the information taken from the image sound line random access memory.

2. The apparatus in combination according to claim 1, wherein said modulator is an electro-optic modulator.

3. The apparatus in combination according to claim 1, wherein said modulator is an electro-acoustic modulator.

4. The apparatus in combination according to claim 1, wherein said sweep deflecting unit is a vibratory mirror.

5. The apparatus in combination according to claim 1, wherein said sweep deflecting unit is a turntable mirror wheel, having an outer edge made up of mirror flats.

6. The apparatus in combination according to claim 1, wherein said sweep deflecting unit is a turnable prism.

7. The apparatus in combination according to claim 5, having, in part of the path of the light from the modulator to the mirror wheel, a polarization switch, a double-refracting crystal placed after said switch in the direction of the light, and after said crystal in the direction of the light including a ray splitter, making an angle of 45° to the light path, and arranged for deflecting the light beam at a right angle to the mirror flats of said mirror wheel, and a system for switching over said polarization switch when a corner, formed between two mirror flats of the mirror wheel, gets to the beam reflected in said double-refracting crystal, and when th beam, not deflected in said crystal, is directed normally to one mirror flat of said mirror wheel.

8. The apparatus in combination according to claim 7, further having a first objective, a second objective on the light output side of said first objective, a second double-refracting crystal on the light output side of said second objective, said first and second objectives and said second double-refracting crystal being placed in the path of said light after being reflected by said mirror wheel, and a microscope objective in the light path between the second double-refracting crystal and the light-sensitive layer.

9. The apparatus in combination according to claim 8, further having a linear motor for moving said carriage, a further linear motor for turning the turntable and a control system for controlling such motion of the carriage and turning of the turntable.

10. The apparatus in combination according to claim 9, having a condenser, and a cylindrical lens on the light output side of said condenser, said cylindrical lens having a cylinder axis normal to the line direction.

11. The apparatus in combination according to claim 10, wherein said light-sensitive layer is made up of a material that evaporates under the effect of said light beam.

* * * * *